(12) United States Patent
Hasan et al.

(10) Patent No.: US 12,387,055 B2
(45) Date of Patent: Aug. 12, 2025

(54) SYSTEM AND METHOD FOR ENABLING GENERATION OF INDUSTRY-TAILORED VIRTUAL ASSISTANTS

(71) Applicant: Quantiphi Inc, Marlborough, MA (US)

(72) Inventors: Asif Hasan, Marlborough, MA (US); Kanishk Mehta, Mumbai (IN); Aditya Guruprasad, Mumbai (IN); Vasudev Chatterjee, Mumbai (IN); Parvathi K, Mumbai (IN)

( * ) Notice: Subject to any disclaimer, the term of this patent is extended or adjusted under 35 U.S.C. 154(b) by 323 days.

(21) Appl. No.: 17/930,617

(22) Filed: Sep. 8, 2022

(65) Prior Publication Data

US 2024/0086646 A1    Mar. 14, 2024

(51) Int. Cl.
*G06F 40/40* (2020.01)
*G06F 40/30* (2020.01)

(52) U.S. Cl.
CPC ............ *G06F 40/40* (2020.01); *G06F 40/30* (2020.01)

(58) Field of Classification Search
CPC ................................ G06F 40/40; G06F 40/30
See application file for complete search history.

(56) References Cited

U.S. PATENT DOCUMENTS

| | | |
|---|---|---|
| 10,943,072 B1 | 3/2021 | Jaganmohan |
| 11,144,836 B1 * | 10/2021 | Podgorny ............... G06F 40/35 |
| 11,159,457 B2 | 10/2021 | Liang et al. |
| 11,373,132 B1 * | 6/2022 | Sweet ............. G06Q 10/06375 |
| 2020/0005117 A1 * | 1/2020 | Yuan ....................... G06F 40/35 |
| 2021/0165967 A1 * | 6/2021 | Shek ...................... G06F 40/295 |
| 2022/0335307 A1 * | 10/2022 | Wang ........................ G06N 5/02 |
| 2023/0022673 A1 * | 1/2023 | Derzsy ................... G06N 5/022 |
| 2024/0095455 A1 * | 3/2024 | Sharma ................... G16H 10/60 |

FOREIGN PATENT DOCUMENTS

WO    WO-2023249684 A1 * 12/2023 ........... G06F 40/216

OTHER PUBLICATIONS

Hwang, et al., "Chatti: A Conversational Chatbot Platform", published in The Workshops of the Thirty-Second AAAI Conference on Artificial Intelligence, dated 2018, pp. 145-148.

* cited by examiner

*Primary Examiner* — Mohammad K Islam
(74) *Attorney, Agent, or Firm* — RC Trademark Company

(57) ABSTRACT

Disclosed is system for enabling generation of industry-tailored virtual assistants. System comprises server(s) and data repository communicably coupled to server(s), wherein server(s) is configured to: receive raw conversation data from at least one data source, transform raw conversation data to generate processed conversation data, generate taxonomy(-ies) of industry using processed conversation data, label processed conversation data to generate labelled conversation data, create relationships between entities in labelled conversation data and taxonomy(-ies), generate dataset pertaining to digital warehouse that is usable to generate industry-tailored virtual assistants, and provide digital warehouse using dataset on digital portal that is accessible by target device(s) wherein digital portal is hosted by server(s), wherein digital warehouse comprises listings for set of items including one or more of: intent(s), skill(s), virtual assistant template(s), pre-built and pre-trained virtual assistant(s).

20 Claims, 3 Drawing Sheets

SYSTEM AND METHOD FOR ENABLING GENERATION OF INDUSTRY-TAILORED VIRTUAL ASSISTANTS

TECHNICAL FIELD

The present disclosure relates to systems for enabling generation of industry-tailored virtual assistants. Moreover, the present disclosure also relates to methods for enabling generation of industry-tailored virtual assistants.

BACKGROUND

With an advent in civilization, there has been a huge commercial and economic boom, with new businesses launching rapidly. Each of these businesses have identified some gaps in present working of society and are affixed to resolve the same. Although some of such businesses are conglomerates which function in multiple industries, most small-scale and medium-scale businesses focus on one specific industry, or a few related industries. For example, a first business may focus on merely healthcare, whereas a second business working in the paper industry may also work with writing instruments.

Since today's is a digital world, information about all such businesses (as well as the products and/or services being offered thereby), are available to each consumer easily. Often, such information is available on websites or other digital portals. Since websites may be information-rich, they may be difficult to traverse through for a consumer. Mostly, consumers get overwhelmed going through such websites and/or digital portals and end up not buying anything. Due to this, virtual assistants have been created to assist consumers in buying products/services as per their requirements, and for providing customer service.

However, such virtual assistants may often not understand a question and/or concern since it follows a communication pattern integrated therein. Due to this, nowadays virtual assistants are trained using conversation artificial intelligence methods such that an intent in a natural language of the consumer is accurately understood. For example, Google Diagflow, Amazon Lex, Cogniy, IBM Watson Assistant, Rasa, Replicant, and the like. This has led to another problem: the building and training for such industry-specific and conversational artificial intelligence enabled virtual assistants is extremely time-taking, involves a lot of effort and may even require organizational change management, which may be harmful for any business or organization since more time is spent on developing such virtual assistants than on their core business.

Therefore, in light of the foregoing discussion, there exists a need to overcome the aforementioned drawbacks associated with generation of industry-specific virtual assistants.

SUMMARY

The present disclosure seeks to provide a system for enabling generation of industry-tailored virtual assistants. The present disclosure also seeks to provide a method for enabling generation of industry-tailored virtual assistants. An aim of the present disclosure is to provide a solution that overcomes at least partially the problems encountered in prior art.

In one aspect, an embodiment of the present disclosure provides a system for enabling generation of industry-tailored virtual assistants, the system comprising at least one server and a data repository communicably coupled to the at least one server, wherein the at least one server is configured to:
receive raw conversation data from at least one data source, wherein the raw conversation data pertains to at least one industry;
transform the raw conversation data to generate processed conversation data;
generate at least one taxonomy of the at least one industry, using the processed conversation data;
label the processed conversation data to generate labelled conversation data;
create relationships between entities in the labelled conversation data and the at least one taxonomy, using at least one of: a knowledge graph, an ontology, of the at least one industry;
generate a dataset pertaining to a digital warehouse that is usable to generate the industry-tailored virtual assistants, based at least on the relationships between the entities in the labelled conversation data and the at least one taxonomy, and store the dataset at the data repository; and
provide the digital warehouse, using the dataset, on a digital portal that is accessible by at least one target device, the digital portal being hosted by the at least one server, wherein the digital warehouse comprises listings for a set of items including one or more of: at least one intent, at least one skill, at least one virtual assistant template, at least one pre-built and pre-trained virtual assistant.

In another aspect, an embodiment of the present disclosure provides a method for enabling generation of industry-tailored virtual assistants, the method comprising:
receiving raw conversation data from at least one data source, the raw conversation data pertaining to at least one industry;
transforming the raw conversation data for generating processed conversation data;
generating at least one taxonomy of the at least one industry, using the processed conversation data;
labelling the processed conversation data for generating labelled conversation data;
creating relationships between entities in the labelled conversation data and the at least one taxonomy, using at least one of: a knowledge graph, an ontology, of the at least one industry;
generating a dataset pertaining to a digital warehouse that is usable to generate the industry-tailored virtual assistants, based at least on the relationships between the entities in the labelled conversation data and the at least one taxonomy, and storing the dataset at the data repository; and
providing the digital warehouse, using the dataset, on a digital portal that is accessible by at least one target device, wherein the digital warehouse comprises listings for a set of items including one or more of: at least one intent, at least one skill, at least one virtual assistant template, at least one pre-built and pre-trained virtual assistant.

Embodiments of the present disclosure substantially eliminate or at least partially address the aforementioned problems in the prior art and enable generation of industry-tailored virtual assistants.

Additional aspects, advantages, features, and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
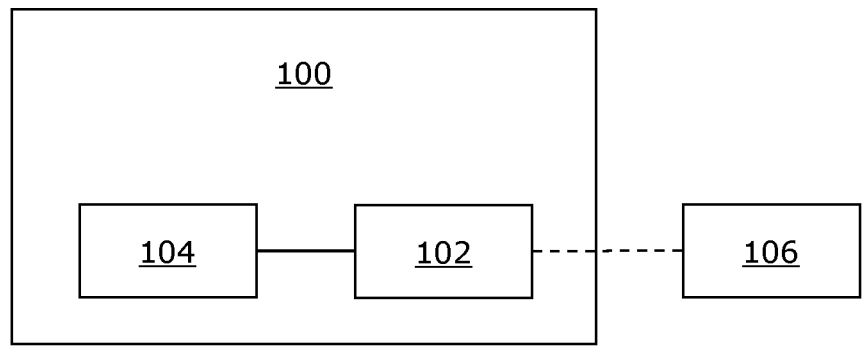
FIG. 1 illustrates a block diagram of a system for enabling generation of industry-tailored virtual assistants for enabling generation of industry-tailored virtual assistants, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a system for enabling generation of industry-tailored virtual assistants, the system comprising at least one server and a data repository communicably coupled to the at least one server, wherein the at least one server is configured to:
  receive raw conversation data from at least one data source, wherein the raw conversation data pertains to at least one industry;
  transform the raw conversation data to generate processed conversation data;
  generate at least one taxonomy of the at least one industry, using the processed conversation data;
  label the processed conversation data to generate labelled conversation data;
  create relationships between entities in the labelled conversation data and the at least one taxonomy, using at least one of: a knowledge graph, an ontology, of the at least one industry;
  generate a dataset pertaining to a digital warehouse that is usable to generate the industry-tailored virtual assistants, based at least on the relationships between the entities in the labelled conversation data and the at least one taxonomy, and store the dataset at the data repository; and
  provide the digital warehouse, using the dataset, on a digital portal that is accessible by at least one target device, the digital portal being hosted by the at least one server, wherein the digital warehouse comprises listings for a set of items including one or more of: at least one intent, at least one skill, at least one virtual assistant template, at least one pre-built and pre-trained virtual assistant.

In another aspect, an embodiment of the present disclosure provides a method for enabling generation of industry-tailored virtual assistants, the method comprising:
  receiving raw conversation data from at least one data source, the raw conversation data pertaining to at least one industry;
  transforming the raw conversation data for generating processed conversation data;
  generating at least one taxonomy of the at least one industry, using the processed conversation data;
  labelling the processed conversation data for generating labelled conversation data;
  creating relationships between entities in the labelled conversation data and the at least one taxonomy, using at least one of: a knowledge graph, an ontology, of the at least one industry;
  generating a dataset pertaining to a digital warehouse that is usable to generate the industry-tailored virtual assistants, based at least on the relationships between the entities in the labelled conversation data and the at least one taxonomy, and storing the dataset at the data repository; and
  providing the digital warehouse, using the dataset, on a digital portal that is accessible by at least one target device, wherein the digital warehouse comprises listings for a set of items including one or more of: at least one intent, at least one skill, at least one virtual assistant template, at least one pre-built and pre-trained virtual assistant.

The present disclosure provides the aforementioned system and the aforementioned method for enabling generation of industry-tailored virtual assistants. Such system and method considerably reduce the time being spent by organizations in building and training such virtual assistants in-house. Moreover, the aforementioned system and the aforementioned method provide the set of items including one or more of: the at least one intent, the at least one skill, the at least one virtual assistant template, the at least one pre-built and pre-trained virtual assistant so that organizations may utilize them in an out-of-the-box manner, without any additional effort. Moreover, the set of items may be fine-tuned by the organizations with minimal effort, for customization purposes. In such manner, less effort and time may be spent on training/building the set of items and more may be spent on the business. Since the set of items are built using industry-based taxonomies, a high accuracy rate is observed with respect to the set of items (i.e., virtual assistants) understanding the consumer efficiently. For example, in a mechanical industry, word 'compact' would mean that an object is space-efficient, however, in a cosmetic industry, it would refer to a make-up item. Since the at least one intent, the at least one skill, the at least one virtual assistant template, the at least one pre-built and pre-trained virtual assistant are industry-tailored, differences between the two compacts would be evident based on which organization the set of items is deployed at. It will be appreciated that the digital warehouse lists the set of items therein, such that the organization may choose one based on their organizational and industry-based preferences.

It will be appreciated that the system for enabling generation of the industry-tailored virtual assistants is facilitated to enable the generation by pre-building and pre-training the industry-tailored virtual assistants. Herein, the system creates patterns from raw conversation data of different industries and trains the virtual assistants on these patterns to have industry-based skills and intents.

Throughout the present disclosure, the term "server" refers to hardware, software, firmware, or a combination of these that provides functionality by way of providing resources, data, services, or programs to other servers, and/or the system. Optionally, the at least one server is implemented as at least one of: a cloud server, a local server. Notably, a given server comprises processing capabilities, such that processing tasks are performed by the given server itself.

Throughout the present disclosure, the term "data repository" refers to a memory, capable of storing resources, data, services, or programs. Herein, the data repository is communicably coupled to the server. The term "memory" refers to a volatile or persistent medium, such as an electrical circuit, magnetic disk, virtual memory, or optical disk, in which data or software can be stored for any duration. The data repository may be a local memory that is integrated with the server, may be an external memory, may be a cloud-based memory, or similar. The at least one server is communicably coupled to the data repository via a first communication network. It will be appreciated that a given communication network may be wired, wireless, or a combination thereof. Examples of the given communication network may include, but are not limited to, Internet, a local network (such as, a TCP/IP-based network, an Ethernet-based local area network, an Ethernet-based personal area network, a Wi-Fi network, and the like), and a short-range radio network (such as Bluetooth®).

Throughout the present disclosure, the term "raw conversation data" refers to a collection of conversation data which has not been processed, cleaned, or analyzed. This raw conversation data may pertain to different forms of communication data, for example, textual data, voice data from recorded phone calls, video call data, image data of conversations, and so forth. Optionally, voice data and/or video call data is/are transcribed upon being received. In this regard, transcriptions of the voice data and/or video call data are generated prior to processing (i.e., transformation). Such transcriptions may also be considered as a part of the raw conversation data. It will be appreciated that such raw conversation data provides useful insights into conversations pertaining to the at least one industry. Optionally, the raw conversation data is unlabeled conversation data. This means that the raw conversation does not include any labels as to the nature of the conversations.

Optionally, the raw conversation data is in form of a natural language, and wherein the raw conversation data comprises at least one of: information pertaining to intents of people, information pertaining to skills of virtual assistants, personally identifiable information (PII), payment card industry (PCI) information, and protected health information (PHI). The term "natural language" refers to any language that has evolved naturally in humans through use and repetition without conscious planning or premeditation. Examples of natural language include, English, Spanish, French, German, Cantonese, Mandarin, Sanskrit, and so forth. Optionally, natural language may take on different forms, for example, textual, speech, or signing (i.e., signage). Optionally, the at least one server executes a machine learning model capable of implementing at least one natural language processing algorithm, for processing the raw conversation data.

The term "intents of people" refers to at least one thought, feeling, action, agenda, request, or similar, of a given person. The intents of people are conveyed in their conversation data, as people express their intents in a natural language while conversing. Moreover, an "intent" of a person may be described as a reason for a conversation of the person. Examples of intents of people include an intent of suggesting, an intent of making a complaint, an intent of making a query, an intent of requesting a service, an intent of obtaining information, an intent of making a purchase, an intent of comparing products/services, an intent of collaborating, and the like. It will be appreciated that the intents of people are analyzed in conversation turns by employing the at least one natural language processing algorithm.

The term "skills of virtual assistants" refers to an ability (or expertise) in performing a given task by a given virtual assistant. Moreover, a given skill of the given virtual assistant relates to (i.e., depends on or is associated with) a collection of intents of people that are connected by a context to form a conversation. Examples of skills of virtual assistants include a skill of making product/service suggestions, a skill of resolving complaints, a skill of fetching answers to queries, a skill of providing a service, a skill of fetching information, a skill of assisting in making purchases, a skill of enabling communication between parties, a skill of processing payments, and the like.

The term "personally-identifiable information (PII)" refers to data which may be utilized to identify a person. Examples of PII include, but are not limited to, a full name, a Social Security number (SSN), a driver's license number, a bank account number, a passport number, and an email address. The term "payment card industry (PCI) information" refers to data which may be utilized to access information pertaining to a person's payment card (i.e., cardholder data). Examples of PCI information include, but are not limited to, a cardholder's name, a cardholder's primary account number, a card expiration date, a card security code, a card pin, a cardholder's associated mobile number. The term "protected health information (PHI)" refers to data collected by healthcare professionals to identify an individual and thereby determine appropriate care. Examples of PHI include, but are not limited to, a set of demographic information, a medical history, a test result, a laboratory result, a mental health condition, a medical diagnosis, an insurance information, and a medical prescription. It will be appreciated that the raw conversation data is in form of the natural language since conversations between two or more entities in a real-world environment occur in the natural language only.

Throughout the present disclosure, the term "data source" refers to a device or a database maintained on a device, or a website hosted by a device, or similar, whereat any data is either created, or digitized, or stored, or broadcasted, or similar. The at least one data source could be a single data source or a plurality of data sources.

Optionally, the at least one data source comprises at least one of: a memory that stores an originating database entity, a server, an open-source repository, a website, a communication channel. The term "originating database entity" refers to a database entity from where at least a portion of the raw conversation data is originated. Examples of the originating database entity include, but are not limited to, a structured query language (SQL) database entity, a No structured query language (NoSQL) database entity, a non-relational database entity, a graph database entity. Optionally, the originating database entity is implemented as at least one of: a No structured query language (NoSQL) database, or a structured query language (SQL) database, a graph database. The NoSQL database stores data in JSON/XML documents rather than relational tables in SQL database. The overall query language used for a NoSQL database follows a similar pattern as an SQL database, however, it has its own set of rules and syntax for querying information from the database.

The term "open-source repository" refers to a repository wherein the raw conversation data of the repository is openly and/or publicly available to be viewed, downloaded, modified, distributed, and reused. Herein, a portion of the database may be sourced from the open-source repository. It will be appreciated that the raw conversation data of the system for enabling generation of industry-tailored virtual assistants, however, is not openly available. For example, the memory that stores the originating database entity may be implemented as a database or a data repository. Nowadays, websites are information-rich, and entail information on a variety of topics including gardening, medicine, skincare, pet care, grooming, and so forth. In lieu of this, it will be appreciated that the raw conversation data may be extracted from the website. For example, the website may be implemented as a podcast or a streaming service.

The term "communication channel" refers to voice or text conversation data between two or more participants. Herein, the participants may be implemented as: two humans, one human and one bot, multiple humans, and so forth. Examples of the communication channel include, but is not limited to, chat-based communication channel, SMS-based communication channel, webchat, social media conversations, telephonic communication channel, voice over web, video conferencing, audio conferencing.

Herein, the at least one industry may be any industry(-ies) that may offer services and/or goods to consumers. Examples of the at least one industry include, but are not limited to, a retail industry, a cosmetic industry, a healthcare industry, an education industry, a medical device industry, a fitness industry, a legal industry, a research industry, a testing industry, a mechanical industry, a production industry, an automation industry, a mining industry. For example, the raw conversation data may pertain to retail industry and healthcare industry. Herein, a portion of raw conversation data in the retail industry may pertain to a customer's chat with a customer care executive. Moreover, with respect to the healthcare industry, a portion of raw conversation data in the healthcare industry may pertain to a customer's chat with a chatbot wherein the customer discloses symptoms being experienced to which the chatbot may suggest some home remedies and share details of a doctor in vicinity to the customer.

Moreover, it will be appreciated that the at least one data source is communicably coupled to the at least one server. Optionally, the at least one data source is communicably coupled to the at least one server via a second communication network. Herein, it will be appreciated that the raw conversation data is received from the at least one data source by the at least one server via the second communication network. Optionally, the second communication network is implemented as a part of or in combination with the first communication network. Beneficially, the raw conversation data is received by the at least one server to be transformed and processed, which ultimately leads to generating the processed conversation data.

Throughout the present disclosure, the term "processed conversation data" refers to conversation data which has been processed by the at least one server, wherein the at least one server implements at least one transformation on the raw conversation data to generate the processed conversation data. Herein, such processing may be performed for a plurality of reasons (for example, such as organizing the raw conversation data systematically, securing private information in the raw conversation data, or similar), using the at least one transformation, for finally resulting in the processed conversation data. Optionally, the at least one transformation is applied in a sequential manner. Beneficially, the raw transformation data is transformed to generate the processed conversation data, since the processed conversation data can be usefully utilized for generating the at least one taxonomy of the at least one industry.

Optionally, the transformation of the raw conversation data comprises at least one of: data curation, data sanitization, data loss prevention, data anonymization, data filtering, data keyword identification, natural language processing (NLP). Herein, the transformation is performed by processing the taxonomy, removal of the personally identifiable information, and labelling and sub-categorization of the conversation data for being converted into a suitable format for ingestion into the database. The term "data curation" refers to organization and integration of data collected from the at least one data source. Optionally, data curation comprises annotation, publication, and presentation of the raw communication data for transformation, such that values of the processed conversation data remain available for reuse and preservation. Examples of data curation include, but are not limited to, finding head labels, finding parent categories, finding sub-domains, classifying sub-divisions of head labels and parent categories.

The term "data sanitization" refers to securely and permanently erasing sensitive data from the raw conversation data to transform it into the processed conversation data, such that no residual sensitive data may be recovered even through extensive forensic analysis. Examples of data sanitization include, but are not limited to, removal of personally identifiable information, normalization of data, removal of unnecessary noise form data. The term "data loss prevention" refers to detection of potential data breaches in the raw conversation data, which are prevented by monitoring, detecting, and blocking sensitive data while in use for transforming into the processed conversation data. In an example, rules and triggers may be specified which may allow a user to control presentation of data with certain restrictions.

The term "data anonymization" refers to an information sanitization measure which protects private information in the raw conversation data, wherein the transformation includes removal of personally identifiable information such that identity of persons described in the processed conversation data remain anonymous. Examples of data anonymization include, but are not limited to, removal of name, removal of date of birth, removal of medical history, removal of identity cards, removal of payment information, removal of address. The term "data filtering" refers to choosing, and thereby using, a subset of the raw conversation data as the processed conversation data, for analysis. In an example, a dataset is analyzed to allow only complete and relevant data, and incomplete or irrelevant data is removed.

The term "data keyword identification" refers to identifying different datatypes using keywords to check that sensitive information is not available in a source code of the processed conversation data. Examples of data keyword identification include, but are not limited to, named entity recognition, slot identification, parts-of-speech tagging, dependency parsers, dependency identification algorithms.

The term "natural language processing (NLP)" refers to transforming or processing the raw conversation data which is in the natural language to the processed conversation data which is in a computer-readable language (i.e., a language that may be interpreted by a computer). It will be appreciated that such forms of transformation allow the raw data to be processed in order to suit different industry-based specificities.

Beneficially, the raw conversation data is transformed into the processed conversation data using more than one forms of transformation. For example, the raw conversation data may be transformed into the processed conversation data using data sanitization and NLP. Herein, initially all sensitive information is removed from the raw conversation data. Thereon, the raw conversation data which is in a natural language is transformed to the processed conversation data which is in a computer-readable language. In this example, the raw conversation data may be in Spanish and be converted into JSON format.

Optionally, the data sanitization comprises removing, from the raw conversation data, at least one of: personally identifying information (PII), payment card industry (PCI) information, protected health information (PHI). It will be appreciated that the PII, PCI and PHI are identity-based information which must not be leaked since it is private information. Herein, leakage of such information may result in identity theft, financial frauds, harassment, and so forth. Therefore, such information is beneficially removed during the data sanitization, such that such above-mentioned crimes are prevented.

Throughout the present disclosure, the term "taxonomy" refers to a science of classification, especially of a plurality of fields of the at least one industry. Specifically, the at least one taxonomy of an industry classifies companies, organizations and traders into industrial groupings based on similarities in at least one of: production processes, products, similar behavior in financial markets. The at least one taxonomy may be visualized as a tree having multiple branches and sub-branches wherein each branch and sub-branch pertains to a given classification or entity. It will be appreciated that no special theory lies behind modern taxonomy methods, and the at least one taxonomy may be generated differently by different enterprises. In the present invention, firstly giants are selected from a given domain, secondly a manual scraping is performed, and a raw taxonomy is created. This is utilized for creating the at least one taxonomy, and a dictionary for each domain.

In an example, if the domain is telecom, the giants in telecom are identified as Airtel, Vodafone, AT&T and Verizon. Herein the raw taxonomy includes billing, payments, porting, and plans; and the generated taxonomy comprises domains, drivers (sub-domains), intent-head, domain-driver intent path, and skills. In another example, in an industry taxonomy, an education industry may fall under classifications 'services' and 'products', such that teaching may be labelled under 'services' and books may fall under 'products'. It will be appreciated that each industry will have its own taxonomy. Moreover, a given industry may have more than one taxonomy. For example, a taxonomy of retail industry would be different from a taxonomy of healthcare industry, and the healthcare industry may have a first taxonomy related to healthcare services and a second taxonomy related to diseases. It will be appreciated that the generation of the at least one taxonomy of the at least one industry is performed by the at least one server. Beneficially, the at least taxonomy is generated by assigning a classification for at least one utterance in the processed conversation data. For example, in processed conversation data pertaining to a healthcare industry, an utterance 'tumor' may be classified under 'abnormal growth'. Once a biopsy is conducted and results are conclusive, a 'malignant tumor' may be classified under 'cancer'.

Optionally, when generating the at least one taxonomy of the at least one industry, the at least one server is configured to execute a first software application to generate the at least one taxonomy autonomously or semi-autonomously. Throughout the present disclosure, the term "software application" refers to a computer-based program designed to conduct a specific task, typically to be used by end-users. The generation of the at least one taxonomy "autonomously" means that the at least one server generates the at least one taxonomy independently, without requiring any input(s) from any other entity (such as a human taxonomist). Alternatively, the at least one server may require an input and/or approval from the other entity for generating the at least one taxonomy. Herein, the entity refers to a person and or computing node that is capable of controlling the task of generating the at least one taxonomy of the at least one server. For example, the entity may be a taxonomist who may confirm if a given taxonomy is correct prior to the generation of the same. Moreover, the input and/or approval may be given in a direct or indirect manner. Herein, the input and/or approval may be given specifically by the entity stating 'this is an approval for the given taxonomy' or in any textual, verbal, or other form. For example, the input and/or approval may be given by touching or tapping a given portion of a monitor. It will be appreciated that such autonomy of the at least one server is beneficial since it allows the at least one server to conduct its tasks independently, without consistently waiting on approvals which may cause undue delay. Additionally, parallelization of servers is implemented, such that each server is facilitated to individually conduct their tasks independently. This beneficially saves time and enables quick processing.

The term "labelled conversation data" refers to conversation data that has been tagged with one or more labels. Such labels are akin to informative tags which provide information regarding the data. For example, a label "tuberculosis" may refer to health-based conversation data pertaining to a disease tuberculosis, its diagnosis, symptoms, and the like. The processed conversation data is labelled to classify keywords in a conversation, which provides insights pertaining to the conversation. For example, conversation data pertaining to a call between a customer and a customer care executive regarding medicines would be labelled 'medicine'.

Optionally, when labelling the processed conversation data, the at least one server is configured to execute a second software application to generate the labelled conversation data autonomously or semi-autonomously. When the labelled conversation data is being generated semi-autonomously, an administrative person may oversee the labelling of the processed conversation data to ensure correctness. For example, if any data entity has been mis-labelled, and so forth. In an example, a clustering algorithm is utilized to identify similar groups in the processed conversation data and assign labels accordingly. Hereinafter, the taxonomists may confirm such labelling of the data. Moreover, time involved with labelling the processed conversation is drastically reduced when using the clustering algorithm, which is beneficial for quick processing.

It will be appreciated that each of the labelled conversation data and the at least one taxonomy contain several entities. Herein, relationships are created between the entities in the labelled conversation data and the entities in the at least one taxonomy by mapping such entities with each other. For example, an entity labelled as "tuberculosis" in the labelled conversation data is mapped with another entity under "lung disease" in the at least one taxonomy. Moreover, optionally such relationships are created by mapping patterns in a neural network. The term "knowledge graph" refers to a data structure that is built on a knowledge base by utilizing graph-based data modelling to integrate data of the knowledge base in a graphical manner. Moreover, the knowledge graph represents a network of real-world entities (for example, such as, objects, events, situations, concepts, and so forth) and illustrates relationships between them. Examples of the knowledge graph includes, but it is not limited to, a relational knowledge graph, a hierarchical knowledge graph, a linear knowledge graph, a property knowledge graph, a triple-store knowledge graph, a hyper knowledge graph. The term "ontology" refers to grouping of entities in descriptive categories and identifying their relations with each other. It will be appreciated that since the ontology consists of unique groupings of the entities and their relationships therein, the relationships between the entities in the labelled conversation data and the at least one taxonomy are created by mapping the relations in the ontology. In an example of a healthcare related ontology, key entities for a given use case would be identified. If the given use case pertains to a process of admission for a patient in a hospital, the patient and the hospital may be considered as entities. The patient's medical profile would be considered another entity, which in turn would have several sub-fields as a description of the profile. The patient and the medical profile would share a certain relation (e.g., belonging to, such that the medical profile belongs to the patient). Similarly, the medical profile and hospital would share a certain relation (e.g., several medical profiles belong to the hospital).

The term "dataset" refers to a collection of data. Notably, the dataset is comprised of the collection of related sets of data, which may be manipulated as a single unit by a processing node (i.e., the at least one server). It will be appreciated that the dataset is generated based at least on the relationships between the entities in the labelled conversation data and the at least one taxonomy by the at least one server. Notably, the dataset is generated based also on web scraping, process mining, natural language generators, historical data. Optionally, the database is containerized. The term "containerization" refers to packaging of software in such a manner that all necessary components therein (for example, such as, libraries, frameworks, source code, dependencies, and so forth) are isolated in separate containers. Beneficially, containerization helps the database to be scaled automatically, based on a number of users and a load, such that it does not overload or lag. The term "digital warehouse" refers to a platform (i.e., a marketplace) wherein product or service information is provided by a plurality of third parties. For example, a plurality of industry-tailored virtual assistants may be listed on the digital warehouse. Optionally, the digital warehouse is a centralized marketplace. Herein, all listings and/or orders are routed through one central exchange. Alternatively, optionally, the digital warehouse is a decentralized marketplace. Herein, a plurality of consumers may associate with a plurality of providers separately. Notably, the digital warehouse is a computer network marketplace. This means that the digital warehouse is provided using a device of a computer network, such as the at least one server that belongs to a computer network also including the data repository. It will be appreciated that the dataset pertaining to the digital warehouse is stored at the data repository since it results in fast retrieval of data and minimizes latency, as the at least one server and the data repository are communicably coupled.

Optionally, the dataset pertaining to the digital warehouse is stored at the data repository in a NO-structured query language (SQL) database. The term "NO-structured query language (SQL) database" refers to a non-tabular database, wherein a mechanism or storage and retrieval of data is modelled in means other than tabular relations. Examples of the NO-SQL database include, but are not limited to, a document database, a key-value database, a column-oriented database, a graph database. It will be appreciated that once the dataset is stored in the NO-SQL database, it is transformed into a finalized dataset which is thereby used for the virtual assistants.

The term "digital portal" refers to a software-based portal which is specifically designed to gather and thereby provide information pertaining to a given topic therein. Herein, the digital portal may be accessed using internet. Notably, the digital portal may function as a gateway and provide links and directions to multiple sources of information. Notably, the digital portal is stored at the data repository. It will be appreciated that the dataset is divided into meaningful domains, wherein each domain is considered as a collection of related data. Moreover, each domain also contains conversational data in terms of a conversation flow and set of intents which altogether accomplish a given task, Thereon, the data is stored on a data source, from where it is exposed onto the digital platform via REST API calls. The term "target device" refers to refers to a device associated with an end-user, which is capable of processing, presenting and/or storing data. Examples of the target device include, but are not limited to, a server, a computer, a smartphone, a tablet, a phablet, a laptop, and a smart watch. It will be appreciated that the at least one target device is associated with the end-user. Optionally, the target device accesses the digital portal using internet. Optionally, the target device is implemented as a user device. The term "user device" refers to a device associated with a user (i.e., the person), which is capable of processing and/or storing data. Examples of the user device include, but are not limited to, a server, a computer, a smartphone, a tablet, a phablet, a laptop, and a smart watch. It will be appreciated that such sources of data are beneficially used for receiving the raw conversation data since they appropriately collect the raw conversation data from people and thereby provide the same to the at least one server.

Notably, the digital warehouse comprises listings for the set of items including one or more of: the at least one intent, the at least one skill, the at least one virtual assistant template, the at least one pre-built and pre-trained virtual assistant. Herein, the at least one intent refers to a classification of an intention of a user in a conversation turn by a virtual assistant. The at least one skill refers to a collection of intents connected via a context to form a conversation by a virtual assistant. The at least one virtual assistant template refers to a basic template of natural language-based questions and answers that a chat-based or voice-based virtual bot may follow in a conversation. The at least one pre-built and pre-trained virtual assistant refers to an industry-tailored virtual assistant, which is built and trained using a specific industry-related data to be able to specifically deal with queries in the specific industry. Optionally, the set of items also includes the at least one intent, the at least one skill, the at least one virtual assistant template, the at least one pre-built and pre-trained virtual assistant in any given natural language; a list of entities.

Optionally, the at least one server is further configured to:
receive, from the at least one target device, a selection of at least one item from amongst the set of items listed on the digital warehouse; and
export the at least one item that is selected to a target server associated with the at least one target device, the target server being communicably coupled with the at least one server.

The term "target server" refers to a backend server of a customer. The backend server is a portion of any portal, website, software, or interface that is not visible to users. Typically, the backend server is used for storing and organizing data, such that every bit of information being shown at a front-end is suitably working (for example, such as, buttons are working, features like zoom are working, there is low latency, and the like). Notably, the customer is an entity wanting to deploy an industry-tailored virtual assistant. Optionally, the at least one target server is communicably coupled to the at least one server via a third communication network. Optionally, the third communication network is implemented as at least one of: the first communication network, the second communication network. Alternatively, optionally, the first communication network is implemented as the second communication network and the third communication network. It will be appreciated that the selection of the at least one item is made by at least one end-user via the target device. Moreover, the at least one item is exported to the target server such that the at least one item is transferred to the target server (i.e., client's virtual agent environment). Beneficially, the system provides ready-made agents which can be deployed instantaneously at the target server in a fraction of time and costs. Moreover, the at least one item, after being exported to the target server, is deployed from the target server, which enables a fast-loading time during interaction with end-users.

Optionally, the at least one server is further configured to:
provide a payment portal on the digital portal, the payment portal being associated with the digital warehouse; and
enable payment for the at least one item that is selected via the payment portal, prior to exporting the at least one item to the target server.

The term "payment portal" refers to a technology which allows businesses to send invoices, process payments and collect payments. The payment portal may be implemented as at least one of: a web-based software, a stand-alone software. It will be appreciated that an end-user would pay for the at least one item that is selected via the payment portal, prior to the at least one item being exported to the target server. Notably, the payment may be received in at least one of the following manners: as jurisdictional currency, as crypto currency, as digital money, via an e-wallet, as coupons, as tokens, as points, as cash.

Optionally, the target server is configured to deploy the at least one item in at least one of: a natural language understanding (NLU) engine, a natural language generation (NLG) engine, a conversational artificial intelligence (AI) engine. The term "natural language understanding (NLU) engine" refers to a tool which generates facts from a natural language using a plurality of techniques (for example, such as, part-of-speech tags, parsing results, and the like) to understand the natural language, and thereby develop natural language processing-based applications. For example, the NLU engine is capable of identifying intents from user query, identifying entities and keywords from user query, identifying context and next action from user query, identifying sentiment of user query. The term "natural language generation (NLG) engine" refers to a tool which utilizes facts (for example, such as, part-of-speech tags, parsing results, and the like) to generate a natural language. For example, the NLG engine is capable of correcting grammar, generating a language based on a template, generating a language from scratch. The term "conversational artificial intelligence (AI) engine" refers to a tool that assists in building an artificially intelligent system, delivering real-time visibility to risks, threats, and critical operational issues. Examples of tasks performed by the conversational AI engine include, but are not limited to, training a virtual agent to have a task-specific or open-ended conversation, connecting with external data sources to complement the conversation with additional information, detecting a need for escalation and handover to a human agent, resolving real-time user queries efficiently. It will be appreciated that since the at least one item (i.e., either the at least one intent, the at least one skill, the at least one virtual assistant template, or the at least one pre-built and pre-trained virtual assistant) are created using artificial intelligence, and or natural language processing therein. Hence, beneficially, the at least one item is deployed in at least one of the above-mentioned engines for appropriate working and interpretation.

The present disclosure also relates to the method as described above. Various embodiments and variants disclosed above, with respect to the aforementioned first aspect, apply mutatis mutandis to the method.

Optionally, the method further comprises:
receiving, from the at least one target device, a selection of at least one item from amongst the set of items listed on the digital warehouse; and
exporting the at least one item that is selected to a target server associated with the at least one target device, the target server being communicably coupled with the at least one server.

Optionally, the target server is configured for deploying the at least one item in at least one of: a natural language understanding (NLU) engine, a natural language generation (NLG) engine, a conversational artificial intelligence (AI) engine.

Optionally, the at least one data source comprises at least one of: a memory that stores an originating database entity, a server, an open-source repository, a website, a communication channel.

Optionally, the raw conversation data is in form of a natural language, and wherein the raw conversation data comprises at least one of: information pertaining to intents of people, information pertaining to skills of virtual assistants, personally identifying information (PII), payment card industry (PCI) information, and protected health information (PHI).

Optionally, the step of transforming the raw conversation data comprises at least one of: data curation, data sanitization, data loss prevention, data anonymization, data filtering, data keyword identification, natural language processing (NLP).

Optionally, the data sanitization comprises removing, from the raw conversation data, at least one of: personally identifying information (PII), payment card industry (PCI) information, protected health information (PHI).

Optionally, the step of generating the at least one taxonomy of the at least one industry comprises executing a software application for generating the at least one taxonomy autonomously or semi-autonomously.

Optionally, the step of labelling the processed conversation data comprises executing a software application for generating the labelled conversation data autonomously or semi-autonomously.

Optionally, the dataset pertaining to the digital warehouse is stored at the data repository in a NO-structured query language (SQL) database.

DETAILED DESCRIPTION OF THE DRAWINGS

Referring to FIG. 1, illustrated is a block diagram of a system 100 for enabling generation of industry-tailored virtual assistants for enabling generation of industry-tailored virtual assistants. The system 100 comprises at least one server (depicted as a server 102) and a data repository 104. The server 102 and the data repository 104 are communicably coupled. The server 102 receives raw communication data from at least one data source (depicted as a data source 106). Herein, the server 102 and the data source 106 are also communicably coupled.

Figure 2A:
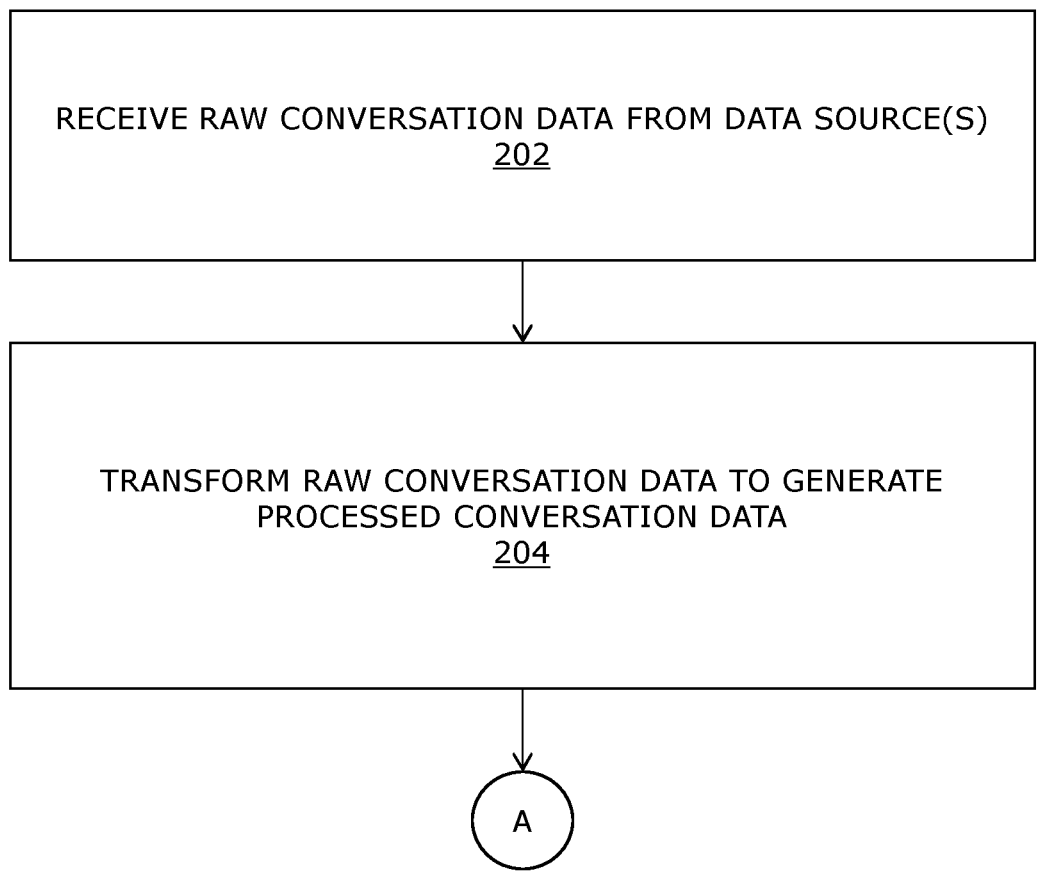
FIG. 2A and FIG. 2B collectively illustrate steps of a method for enabling generation of industry-tailored virtual assistants, in accordance with an embodiment of the present disclosure
Figure 2B:
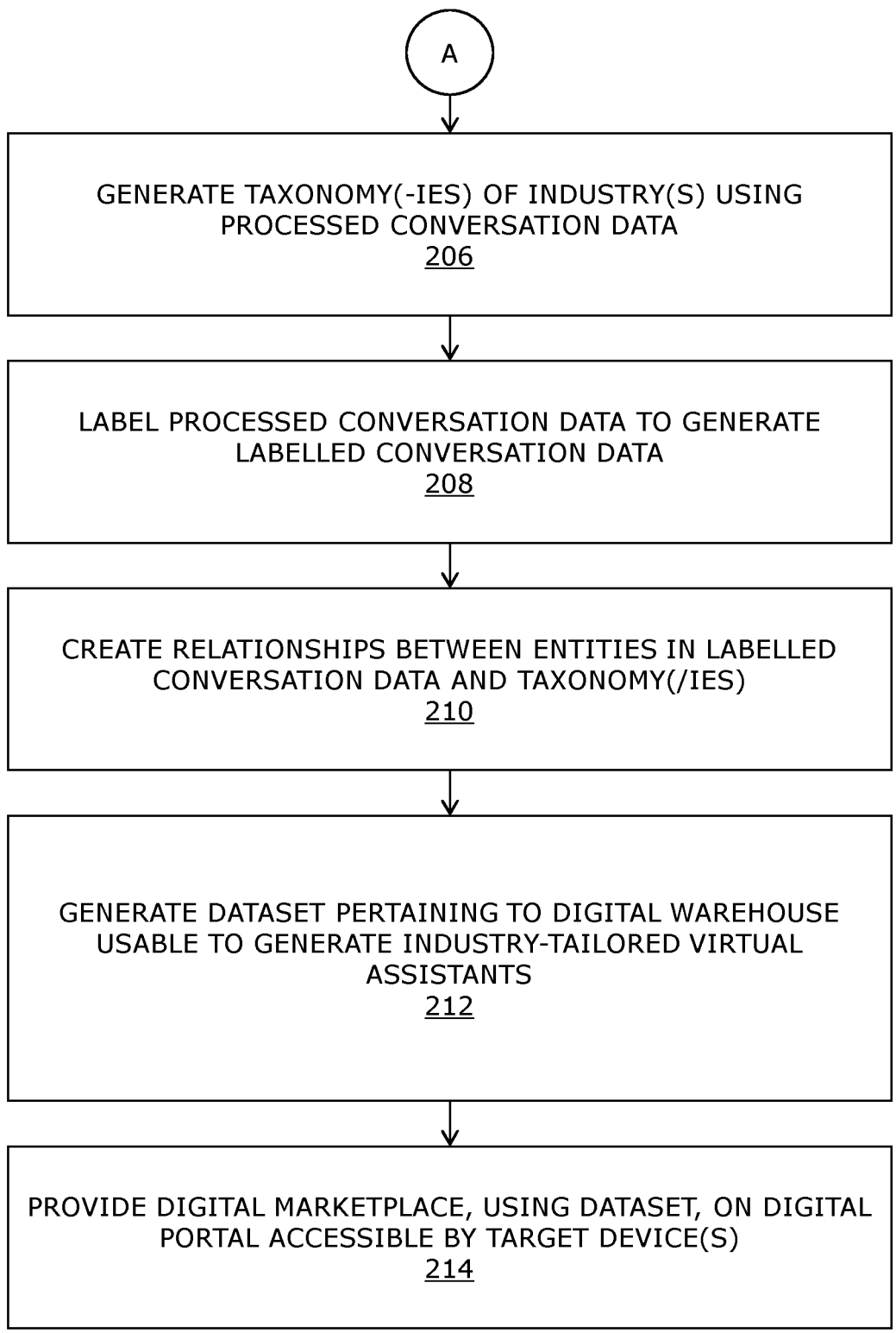

Referring to FIG. 2A and FIG. 2B collectively, illustrated are steps of a method for enabling generation of industry-tailored virtual assistants, in accordance with an embodiment of the present disclosure. At step 202, raw conversation data is received from at least one data source, wherein the raw conversation data pertains to at least one industry. At step 204, the raw conversation data is transformed for generating processed conversation data. At step 206, at least one taxonomy of the at least one industry is generated using the processed conversation data. At step 208, the processed conversation data is labelled for generating labelled conversation data. At step 210, relationships are created between entities in the labelled conversation data and the at least one taxonomy, using at least one of: a knowledge graph, an ontology, of the at least one industry. At step 212, a dataset pertaining to a digital warehouse is generated, wherein the dataset is usable to generate the industry-tailored virtual assistants, based at least on the relationships between the entities in the labelled conversation data and the at least one taxonomy, and the dataset is stored at the data repository. At step 214, the digital warehouse is provided using the dataset on a digital portal that is accessible by at least one target device, wherein the digital warehouse comprises listings for a set of items including one or more of: at least one intent, at least one skill, at least one virtual assistant template, at least one pre-built and pre-trained virtual assistant.

The aforementioned steps are only illustrative and other alternatives can also be provided where one or more steps are added, one or more steps are removed, or one or more steps are provided in a different sequence without departing from the scope of the claims herein.

Figure 3:
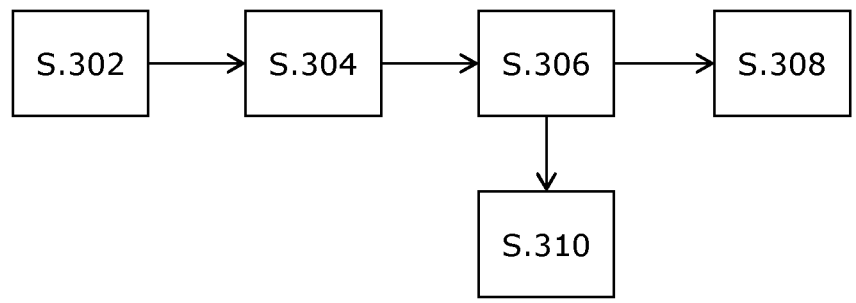
FIG. 3 illustrates a process flow depicting steps of a method for generating at least one taxonomy, in accordance with an embodiment of the present disclosure.

Referring to FIG. 3, illustrated is a process flow depicting steps of a method for generating at least one taxonomy, in accordance with an embodiment of the present disclosure. At step S.302, a domain of at least one industry is identified based on raw conversation data. At step S.304, at least one industry-specific company functioning in the at least one industry is selected by conducting a market research. At step S.306, scraping is performed to create a raw taxonomy. Herein, the scraping may be performed in an autonomous or a semi-autonomous manner. At step S.308, a dictionary is created for each domain, wherein the dictionary comprises at least one of: a use case, an intent, a skill, a training phrase, a term, or terminology used in the at least one industry, a description of the skill or the intent, a domain description. At step S.310, a taxonomy is generated. Herein, the taxonomy comprises a domain, a subdomain (i.e., driver), a head intent, a domain driver intent path, a head intent description, and canonical examples.

The aforementioned steps are only illustrative and other alternatives can also be provided where one or more steps are added, one or more steps are removed, or one or more steps are provided in a different sequence without departing from the scope of the claims herein.

Figure 4:
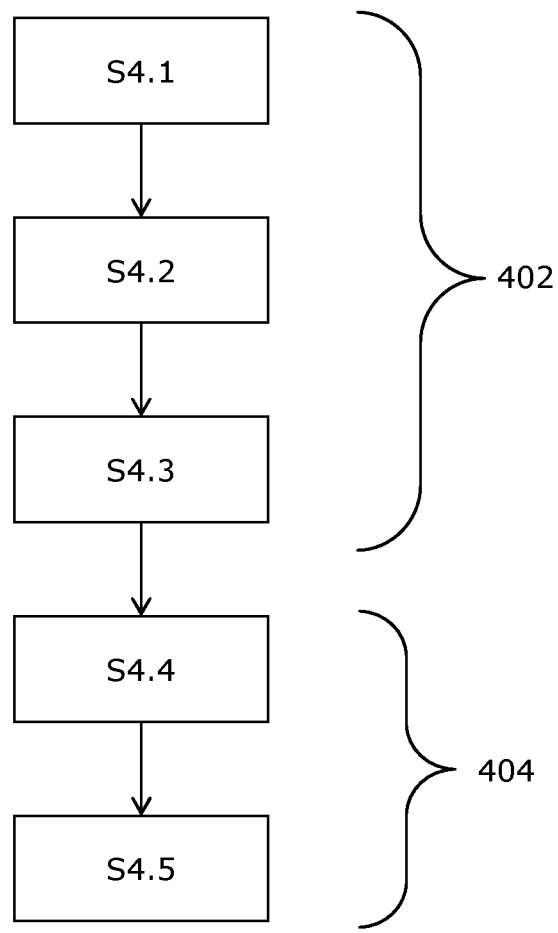
FIG. 4 illustrates an exemplary process flow depicting steps of a method for creating relationship between entities and generating a dataset pertaining to a digital warehouse, in accordance with an embodiment of the present disclosure.

FIG. 4 illustrates an exemplary process flow depicting steps of a method for creating relationship between entities and generating a dataset pertaining to a digital warehouse, in accordance with an embodiment of the present disclosure. Herein, the steps under 402 depict steps of a method for creating relationships between entities in labelled conversation data and at least one taxonomy, using at least one of: a knowledge graph, an ontology, of at least one industry; and the steps under 404 depict steps of a method for generating a dataset pertaining to a digital marketplace that is usable to generate the industry-tailored virtual assistants, based at least on the relationships between the entities in the labelled conversation data. At step S4.1, a type of entity is identified within the entities in the labelled conversation data and the at least one taxonomy. At step S4.2, at least one context is identified within the labelled conversation data. At step S4.3, entities are mapped to the labelled conversation data in a one-to-many type relationship, based on the at least one context of the conversation. At step S4.4, relationships are created between dialogues in a conversation flow. At step S4.5, a conversation design is created, based on a user's requirements, wherein the conversation design refers to conversational flow based on the user's requirements.

The aforementioned steps are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe, and claim the present disclosure are intended to be construed in a non-exclusive manner, namely allowing for items, components or elements not explicitly described also to be present. Reference to the singular is also to be construed to relate to the plural.

Modifications to embodiments of the present disclosure described in the foregoing are possible without departing from the scope of the present disclosure as defined by the accompanying claims. Expressions such as "including", "comprising", "incorporating", "have", "is" used to describe, and claim the present disclosure are intended to be construed in a non-exclusive manner, namely allowing for items, components or elements not explicitly described also to be present. Reference to the singular is also to be construed to relate to the plural.

What is claimed is:

1. A system for enabling generation of industry-tailored virtual assistants, the system comprising at least one server and a data repository communicably coupled to the at least one server, wherein the at least one server is configured to:
   receive raw conversation data from at least one data source, wherein the raw conversation data pertains to at least one industry;
   transform the raw conversation data to generate processed conversation data;
   generate at least one taxonomy of the at least one industry, using the processed conversation data, wherein the at least one taxonomy is generated by assigning a classification for at least one utterance in the processed conversation data, and wherein generating the at least one taxonomy comprises: identifying a domain of the at least one industry based on the processed conversation data, selecting at least one industry-specific company functioning in the at least one industry, performing automated scraping to create a raw taxonomy, creating a dictionary for the domain comprising at least one of: a use case, an intent, a skill, a training phrase, industry-specific terminology, and generating the at least one taxonomy comprising a domain, a subdomain, a head intent, a domain driver intent path, and canonical examples;
   label the processed conversation data to generate labelled conversation data;
   create relationships between entities in the labelled conversation data and the at least one taxonomy by mapping entities with each other, wherein the relationships are created by mapping patterns in a neural network, using at least one of: a knowledge graph, an ontology, of the at least one industry;
   generate a dataset pertaining to a digital warehouse that is usable to generate the industry-tailored virtual assistants, based at least on the relationships between the entities in the labelled conversation data and the at least one taxonomy, and store the dataset at the data repository, wherein the dataset is divided into domains, each domain comprising a collection of related data, wherein each domain contains conversational data in terms of a conversation flow and a set of intents that collectively accomplish a given task; and
   provide the digital warehouse, using the dataset, on a digital portal that is accessible by at least one target device, the digital portal being hosted by the at least one server, wherein the digital warehouse comprises listings for a set of items including one or more of: at least one intent of the set of intents, at least one skill, at least one virtual assistant template, at least one pre-built and pre-trained virtual assistant,
wherein the transformation of the raw conversation data is applied in a sequential manner.

2. The system of claim 1, wherein the at least one server is further configured to:
   receive, from the at least one target device, a selection of at least one item from amongst the set of items listed on the digital warehouse; and
   export the at least one item that is selected to a target server associated with the at least one target device, the target server being communicably coupled with the at least one server.

3. The system of claim 2, wherein the target server is configured to deploy the at least one item in at least one of: a natural language understanding (NLU) engine, a natural language generation (NLG) engine, a conversational artificial intelligence (AI) engine.

4. The system of claim 1, wherein the at least one data source comprises at least one of: a memory that stores an originating database entity, a server, an open-source repository, a website, a communication channel.

5. The system of claim 1, wherein the raw conversation data is in form of a natural language, and wherein the raw conversation data comprises at least one of: information pertaining to intents of the set of intents of people, information pertaining to skills of virtual assistants, personally identifying information (PII), payment card industry (PCI) information, and protected health information (PHI).

6. The system of claim 1, wherein the transformation of the raw conversation data comprises at least one of: data curation, data sanitization, data loss prevention, data anonymization, data filtering, data keyword identification, natural language processing (NLP).

7. The system of claim 6, wherein the data sanitization comprises removing, from the raw conversation data, at least one of: personally identifying information (PII), payment card industry (PCI) information, protected health information (PHI).

8. The system of claim 1, wherein when generating the at least one taxonomy of the at least one industry, the at least one server is configured to execute a software application to generate the at least one taxonomy autonomously or semi-autonomously.

9. The system of claim 1, wherein when labelling the processed conversation data, the at least one server is configured to execute a software application to generate the labelled conversation data autonomously or semi-autonomously.

10. The system of claim 1, wherein the dataset pertaining to the digital warehouse is stored at the data repository in a NO-structured query language (NoSQL) database.

11. A method for enabling generation of industry-tailored virtual assistants, the method comprising:
   receiving raw conversation data from at least one data source, the raw conversation data pertaining to at least one industry;
   transforming the raw conversation data for generating processed conversation data;
   generating at least one taxonomy of the at least one industry, using the processed conversation data, wherein the at least one taxonomy is generated by assigning a classification for at least one utterance in the processed conversation data, and wherein generating the at least one taxonomy comprises: identifying a domain of the at least one industry based on the processed conversation data, selecting at least one industry-specific company functioning in the at least one industry, performing automated scraping to create a raw taxonomy, creating a dictionary for the domain comprising at least one of: a use case, an intent, a skill, a training phrase, industry-specific terminology, and generating the at least one taxonomy comprising a domain, a subdomain, a head intent, a domain driver intent path, and canonical examples;
   labelling the processed conversation data for generating labelled conversation data;
   creating relationships between entities in the labelled conversation data and the at least one taxonomy by mapping entities with each other, wherein the relationships are created by mapping patterns in a neural network, using at least one of: a knowledge graph, an ontology, of the at least one industry;

generating a dataset pertaining to a digital warehouse that is usable to generate the industry-tailored virtual assistants, based at least on the relationships between the entities in the labelled conversation data and the at least one taxonomy, and storing the dataset at the data repository, wherein the dataset is divided into domains, each domain comprising a collection of related data, wherein each domain contains conversational data in terms of a conversation flow and a set of intents that collectively accomplish a given task; and providing the digital warehouse, using the dataset, on a digital portal that is accessible by at least one target device, wherein the digital warehouse comprises listings for a set of items including one or more of: at least one intent of the set of intents, at least one skill, at least one virtual assistant template, at least one pre-built and pre-trained virtual assistant, wherein the transformation of the raw conversation data is applied in a sequential manner.

12. The method of claim 11, further comprising:

receiving, from the at least one target device, a selection of at least one item from amongst the set of items listed on the digital warehouse; and exporting the at least one item that is selected to a target server associated with the at least one target device, the target server being communicably coupled with the at least one server.

13. The method of claim 12, wherein the target server is configured for deploying the at least one item in at least one of: a natural language understanding (NLU) engine, a natural language generation (NLG) engine, a conversational artificial intelligence (AI) engine.

14. The method of claim 11, wherein the at least one data source comprises at least one of: a memory that stores an originating database entity, a server, an open-source repository, a website, a communication channel.

15. The method of claim 11, wherein the raw conversation data is in form of a natural language, and wherein the raw conversation data comprises at least one of: information pertaining to intents of the set of intents of people, information pertaining to skills of virtual assistants, personally identifying information (PII), payment card industry (PCI) information, and protected health information (PHI).

16. The method of claim 11, wherein the step of transforming the raw conversation data comprises at least one of: data curation, data sanitization, data loss prevention, data anonymization, data filtering, data keyword identification, natural language processing (NLP).

17. The method of claim 16, wherein the data sanitization comprises removing, from the raw conversation data, at least one of: personally identifying information (PII), payment card industry (PCI) information, protected health information (PHI).

18. The method of claim 11, wherein the step of generating the at least one taxonomy of the at least one industry comprises executing a software application for generating the at least one taxonomy autonomously or semi-autonomously.

19. The method of claim 11, wherein the step of labelling the processed conversation data comprises executing a software application for generating the labelled conversation data autonomously or semi-autonomously.

20. The method of claim 11, wherein the dataset pertaining to the digital warehouse is stored at the data repository in a NO-structured query language (NoSQL) database.

* * * * *